US010000251B2

(12) United States Patent
Winters

(10) Patent No.: US 10,000,251 B2
(45) Date of Patent: Jun. 19, 2018

(54) MOTORCYCLE THROTTLE LOCK CRUISE CONTROL

(71) Applicant: David James Winters, Edmonds, WA (US)

(72) Inventor: David James Winters, Edmonds, WA (US)

( * ) Notice: Subject to any disclaimer, the term of this patent is extended or adjusted under 35 U.S.C. 154(b) by 815 days.

(21) Appl. No.: 14/470,810

(22) Filed: Aug. 27, 2014

(65) Prior Publication Data

US 2015/0135886 A1 May 21, 2015

Related U.S. Application Data

(60) Provisional application No. 61/870,767, filed on Aug. 27, 2013.

(51) Int. Cl.
*B62K 11/14* (2006.01)
*B62K 23/04* (2006.01)

(52) U.S. Cl.
CPC .............. *B62K 11/14* (2013.01); *B62K 23/04* (2013.01); *Y10T 74/20516* (2015.01)

(58) Field of Classification Search
CPC ........ B62K 11/14; B62K 23/00; B62K 23/02; B62K 23/04; F16B 7/04; H01H 2009/068; Y10T 74/20516
See application file for complete search history.

(56) References Cited

U.S. PATENT DOCUMENTS

| 1,855,325 | A | * | 4/1932 | De Witt Stone, Sr. | E21B 19/16 24/516 |
|---|---|---|---|---|---|
| 3,982,446 | A | * | 9/1976 | Van Dyken | B62K 23/02 188/77 R |
| 4,137,793 | A | * | 2/1979 | Sowell | B62K 23/04 188/77 R |
| 4,256,197 | A | * | 3/1981 | Kiser, Jr. | B62K 11/14 180/335 |
| 4,364,283 | A | * | 12/1982 | Ricardo | F02D 11/02 403/324 |
| 4,875,386 | A | * | 10/1989 | Dickerson | B62K 11/14 16/421 |
| 5,893,295 | A | * | 4/1999 | Bronnert | B62K 11/14 188/83 |

(Continued)

FOREIGN PATENT DOCUMENTS

EP      2436587 A1 *  4/2012  ............ B60K 26/02

*Primary Examiner* — Adam D Rogers
(74) *Attorney, Agent, or Firm* — Christopher Mayle; John Mouvener; Bold IP, PLLC

(57) ABSTRACT

A cruise control for a vehicle having a mounted rotatable accelerator sleeve and throttle housing which is mounted to a handlebar. The cruise control mounts entirely to the accelerator sleeve and rotates in perfect unity with the throttle when it is rotated. The cruise control is mounted between the throttle housing and the rubber/plastic grip's inner end, directly onto the accelerator sleeve. When the single button of the cruise control is pressed, the cruise control engages and uses friction against the surface of the throttle housing to hold the throttle in place. The operator can force the throttle to rotate by overpowering the friction caused by the cruise control, or preferably, they can disengage the cruise control by pressing the single button again, resetting the cruise control to be engaged again by pressing the single button.

10 Claims, 5 Drawing Sheets

(56) References Cited

U.S. PATENT DOCUMENTS

| | | | | |
|---|---|---|---|---|
| 6,250,173 B1 * | 6/2001 | Huston | ............ | B62K 11/14 |
| | | | | 74/489 |
| 6,318,490 B1 * | 11/2001 | Laning | ............ | B62K 11/14 |
| | | | | 123/349 |
| 6,820,710 B2 * | 11/2004 | Fechner | ............ | B62K 11/14 |
| | | | | 180/170 |
| D593,462 S * | 6/2009 | Mentis | ............ | D12/178 |
| D593,463 S * | 6/2009 | Mentis | ............ | D12/178 |
| D593,464 S * | 6/2009 | Mentis | ............ | D12/178 |
| 8,887,594 B2 * | 11/2014 | Ruth | ............ | G05G 5/04 |
| | | | | 74/488 |
| 9,346,355 B2 * | 5/2016 | Van Baar | ............ | B62K 11/14 |
| 2010/0132500 A1 * | 6/2010 | Cominetti | ............ | B62K 23/04 |
| | | | | 74/504 |
| 2010/0294077 A1 * | 11/2010 | Odendaal | ............ | B62K 11/14 |
| | | | | 74/543 |

* cited by examiner

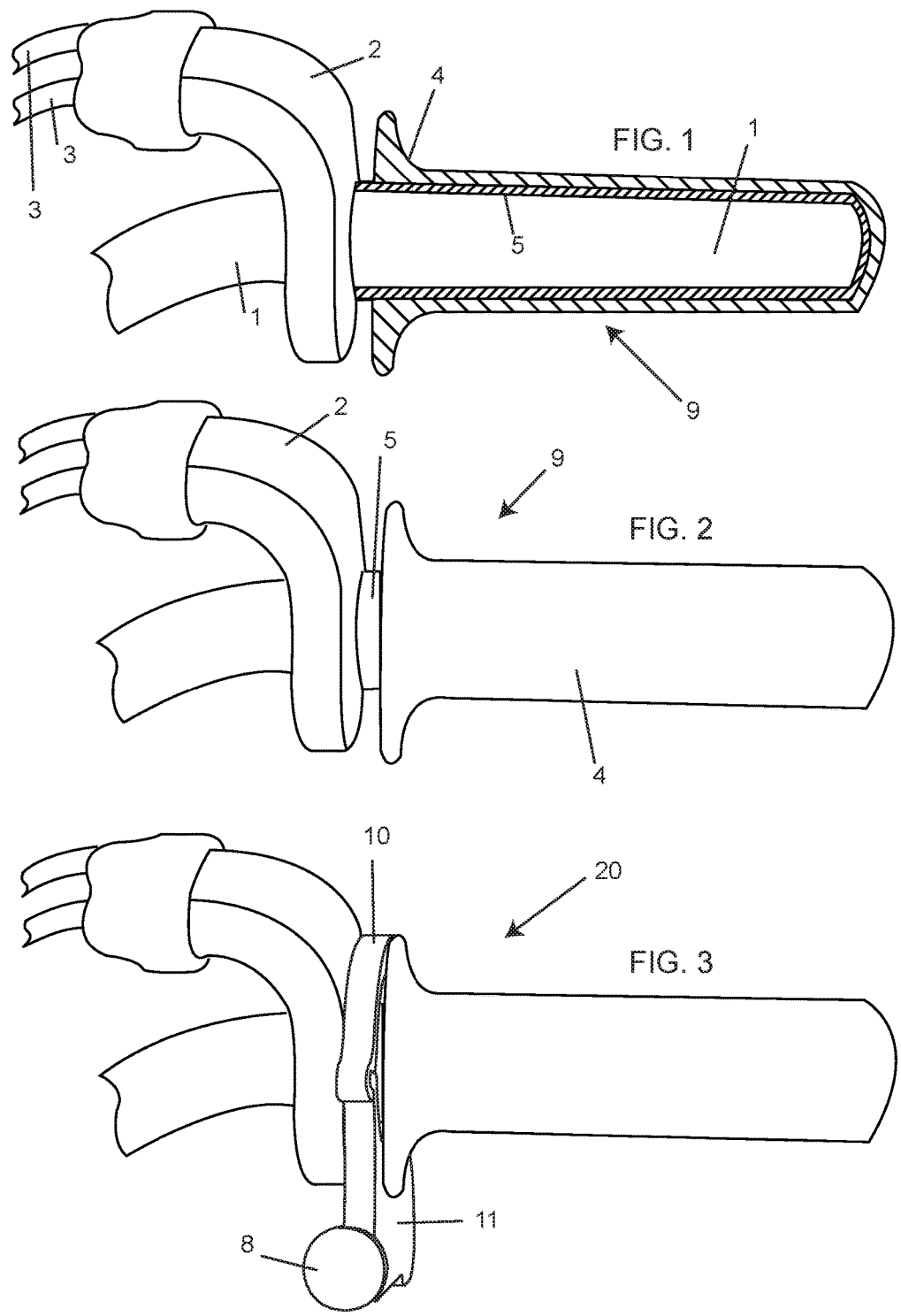

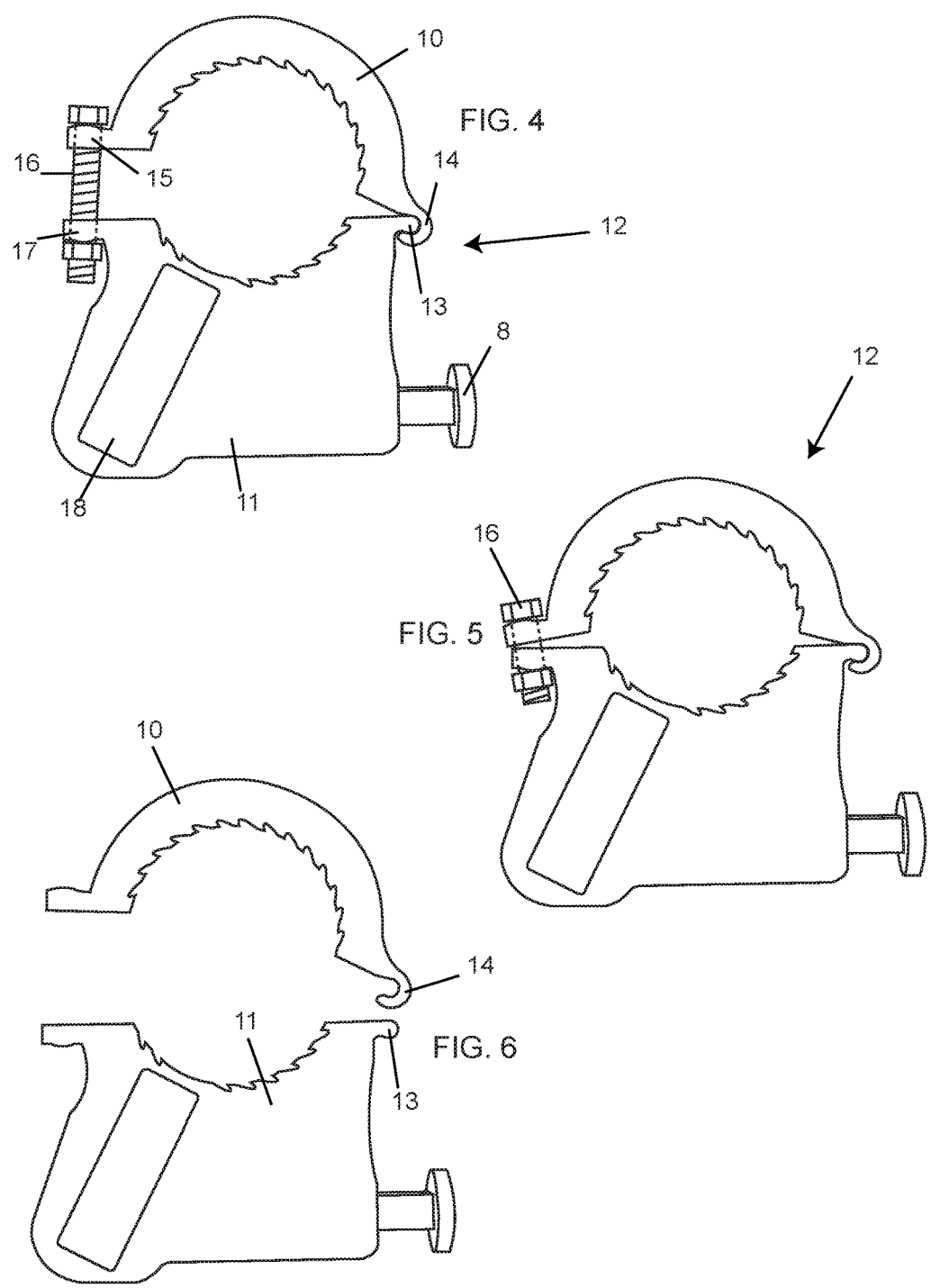

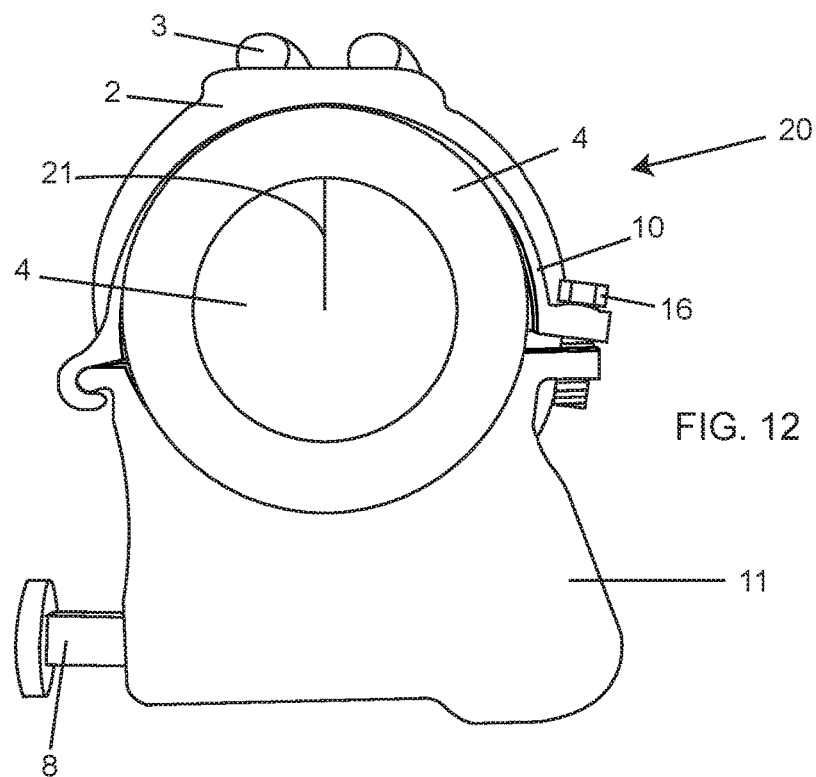
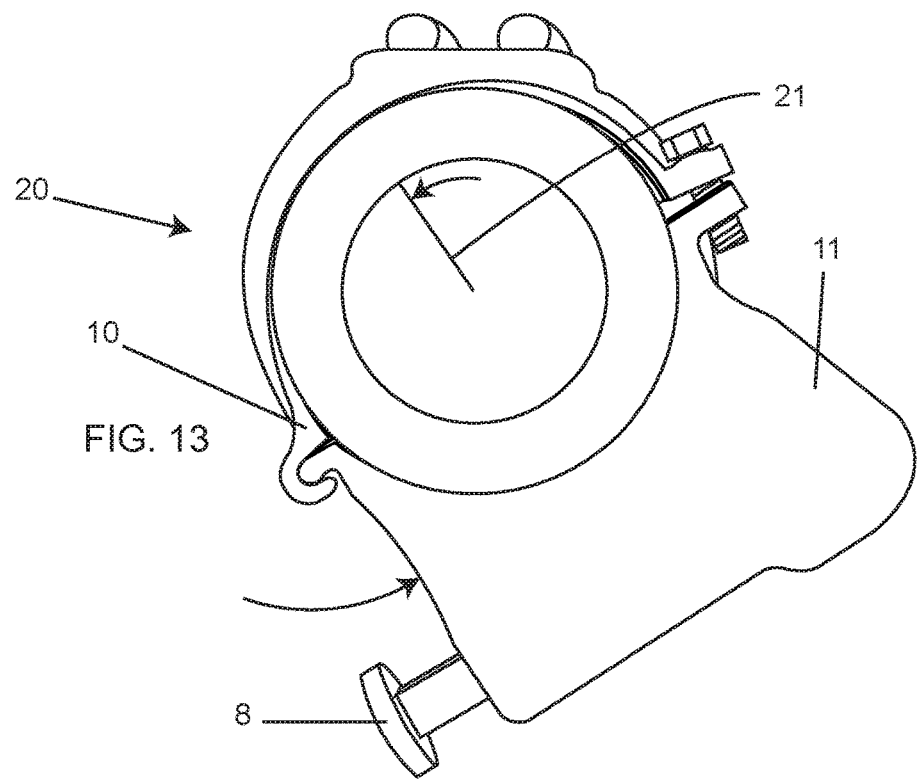

MOTORCYCLE THROTTLE LOCK CRUISE CONTROL

CROSS-REFERENCE TO RELATED APPLICATIONS

This application claims the benefit of Provisional application No. 61/870,767 Filed 27 Aug. 2013.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

BACKGROUND OF THE INVENTION

In many vehicles, such as motorcycles, which use handlebars for steering, the speed of the vehicle is controlled by a mounted rotatable accelerator sleeve unit that is fastened to the right end of the handlebar, which is usually wrapped with a rubber or plastic grip. This rotatable accelerator sleeve, which is commonly called a throttle, is directly coupled to the vehicle's throttle housing, which transfers the rotation of the sleeve into either 1 or more throttle cables or an electronic sensor. Thus, by rotating the accelerator sleeve, the engine in the vehicle will either accelerate, maintain or decelerate the speed of the vehicle, depending on the direction of the rotation.

For convenience and safety purposes, the throttle is typically designed, using a biased return spring, to rotate the throttle back to its resting position, which will maintain the vehicle's engine idle and prevent the vehicle from accelerating. Thus, to maintain a constant speed, the operator of the vehicle must hold the throttle firmly at a desired rotational position, overpowering the throttle's biased return springs. During a long distance motorcycle trip, for example, a motorcycle operator may become fatigued due to the efforts of holding the throttle in one steady position. Lack of motion in the arm, lack of circulation, numbness, vibration injuries because of vibrations from the road and the engine and many other factors can cause numerous injuries to the operator's hand, or even serious injury if the operator's hand falls asleep due to exhaustion, distracting the operator from focusing on the road.

Many devices and methods have been designed to allow an operator of a handlebar steered vehicle to maintain a desired cruising speed without requiring a constant force applied to the throttle by the operator. These devices may be referred to generally as motorcycle cruise controls and/or throttle lock devices.

Some devices require the owner of the vehicle to drill into their throttle housing to mount the device firmly to the throttle housing, which damages the vehicle's warranty. The use of these devices can be seen in U.S. Pat. Nos. 4,256,197 A, 4,137,793 A, 20100294077 A1.

One such device requires the owner of the vehicle to mount the device to the handlebar itself, taking up precious space on the handlebars, restricting the use of other safety gear such as hand guards and could block the operator's usage and view of the controls and dash displays. The use of such a device can be seen in U.S. Pat. No. 3,982,446 A.

Some devices require electricity to work properly. Such a device can be seen in U.S. Pat. No. 6,318,490 B1.

Another device fastens over the throttle's rubber/plastic grip but is not fixed in place. It can be moved, rotated and slide side to side by the operator during the operation of the vehicle. This device covers sections of the throttle grip, restricting the operator's full use of the grip, which was not intended by the manufacture of the vehicle and may easily be accidentally bumped by the operator, causing the vehicle to dramatically decelerate or accelerate with unintended consequences. The use of this device can be seen in U.S. Pat. No. 4,875,386 A.

One device simply covers sections of the throttle grip and restricts full use of the throttle. It takes away space for the operator's hand, especially when the operator is wearing riding gloves. The use of one such device can be seen in U.S. Pat. No. 3,982,446 A.

Another device is designed to disengage once the front brake lever is pulled. This is a safety concern for a motorist. If the device malfunctions, it will prevent the operator from using the front brakes, which, for a motorcycle, provides 75% of the vehicle's stopping power. Not only can the device malfunction and prevent the front brake from engaging, but the cruise control could be stuck in the "on" position and may not be overpowered by the operator. The use of this device can be seen in U.S. Pat. No. 6,820,710 B2.

Still, other devices mount to the bar end of the throttle grip and requires the operator to grab the device and rotate it in the direction of acceleration of the engine's throttle grip to engage the device. This can be extremely dangerous when operating the vehicle off-road with gloves on. The use of these devices can be seen in U.S. Pat. Nos. D593,463 S1, D593,462 S1, D593,464 S1.

BRIEF SUMMARY OF THE INVENTION

The present invention provides a cruise control for any handlebar steered vehicle which uses a mounted rotatable accelerator sleeve unit, or the like, and throttle housing, or the like, to accelerate, maintain and decelerate the speed of the engine and vehicle. This invention allows the owner of the vehicle to install this cruise control directly onto the rotating plastic sleeve without needing to drill into their throttle housing, which could void any warranty on the vehicle, it does not mount to the handlebar itself, which gives the operator more space near the hand controls and dash displays, it functions without the need of an electronic connection, it has no direct connection to front brake which simplifies the construction and prevents any potential malfunction of the cruise control, which could in turn prevent the front brake from being used to slow down and stop the vehicle in an emergency, it does not engage by rotating the throttle, which will prevent the operator from accidentally engaging the cruise control while wearing gloves and/or riding off-road, and it does not cover the throttle's grip in any way.

More specifically, this cruise control can be mounted on a wide variety of mounted rotatable accelerator sleeves units with varying throttle sleeve diameters due to its unique use of the pivotable clamping arm, single body piece, body hinge and cinching bolt. With the use of serrated inner teeth on the clamp and body, this cruise control can securely mount to any average size accelerator sleeve. The mounting point for this invention is located next to the throttle housing, clamped onto the accelerator sleeve which protrudes from the throttle housing, between the throttle housing and the accelerator sleeve's rubber/plastic grip's flange or inner end. This will give the operator easy access to the cruise control with their thumb.

For vehicles with accelerator sleeves, cruising speeds are at different positions of rotation in relation to the handlebars, but all previously designed cruise controls stay in the same location in relation to the handlebars. While the operator's hand rotates to accelerate, maintain or decelerate the vehicle, the location of the fixed controls of the cruise control in relation to the operator's rotated hand has now changed dramatically, which hinders the use of the controls of the cruise control, causing distraction and discomfort to the operator as they try to reach for the controls of the cruise control and causes safety issues when the operator tries to engage or disengage the cruise control. With this invention, when the operator accelerates the engine and vehicle by rotating the accelerator sleeve, the entire invention rotates with the accelerator sleeve, holding the invention and its controls in perfect ergonomic positioning during the entire ride. If the operator chooses to slow the vehicle, they should disengage the cruise control, then re-engage the cruise control at a slower speed. Their hand will not need to awkwardly move to press, roll or otherwise engage/disengage the cruise control. This invention rotates naturally with the operator's hand, not distracting the driver or causing discomfort while they manipulate the controls of the cruise control. This invention is a great advantage for any operator's safety, which has never been seen in a handlebar steered vehicle cruise control before.

For further simplification from other cruise controls, this invention uses only one button to engage and disengage the cruise control. This button can be moved to engage the cruise control, then moved again to disengage the cruise control. When the button is moved to engage the cruise control, a small stopper in the side of the single body piece will protrude from the single body piece and press against the surface of the throttle housing, creating sufficient pressure between the throttle housing and the cruise control, which in turn causes sufficient friction to hold the accelerator sleeve from naturally rolling back to its resting position. At all times, this invention can be overridden by the operator to accelerate or decelerate the engine and vehicle. This may disengage the cruise control. When the button is moved to disengage the cruise control, the stopper will then retract into the single body piece, allowing free rotational movement of the accelerator sleeve without any friction. Once the cruise control is disengaged, the mechanism inside the single body piece will reset, so when it is moved again, it will engage the stopper and start the entire process over again.

BRIEF DESCRIPTION OF THE SEVERAL VIEWS OF THE DRAWING

FIG. 1 is a sectional view of a rubber/plastic grip fixed to the rotatable accelerator sleeve which covers the end of the handlebar and is mounted to the throttle housing which attaches to the handlebar and has two throttle cables protruding from its housing.

FIG. 2 has a perspective view of FIG. 1, viewed from the position of the vehicle's operator, where the rubber/plastic grip is covering the accelerator sleeve, which is covering the handlebar and attached to the throttle housing that has two throttle cables protruding out of the top.

FIG. 3 has a perspective view of FIG. 1, viewed from the position of the vehicle's operator, which shows how this cruise control invention mounts to the rotatable accelerator sleeve unit, between the throttle housing and the rubber/plastic grip, with its control button protruding in an ergonomic position for the operator to use their thumb to engage and disengage the cruise control.

FIG. 4 is a side perspective view of the cruise control which shows the side of the invention that faces the throttle housing, with its rectangular protruding stopper, its single body piece which attaches to the pivotable clamp arm in two places, one with a hinge and a second with a nut and bolt which allows it to clamp to varying throttle sleeve diameters, and the control button which is properly extended in its resting position.

FIG. 5 is a side perspective view, similar to FIG. 4 but showing how the pivotable clamp arm can be cinched down to fit varying throttle sleeve diameters.

FIG. 6 is a side perspective view, similar to FIG. 4 but without the pivotable clamp arm attached to the single body piece by either the hinge nor the nut and bolt holes.

FIG. 12 is a perspective view of the invention from a short distance away from the end of the handlebar, where the cruise control is mounted to the throttle sleeve between the throttle housing and the rubber/plastic grip, where the mounted rotatable accelerator sleeve unit is at rest and rotated to a stop because of the biased springs pulling on the throttle cables.

FIG. 13 is a perspective view, similar to FIG. 12, but showing the rotatable accelerator sleeve unit rotated back to a comfortable cruising position for the operator, with the stopper engaged, holding the throttle in place because of the friction between the throttle housing, the invention and the throttle sleeve, which now overpowers the springs in the throttle cables from rotating the throttle sleeve back to its resting position like in FIG. 12.

DETAILED DESCRIPTION OF THE INVENTION

Figure 7:
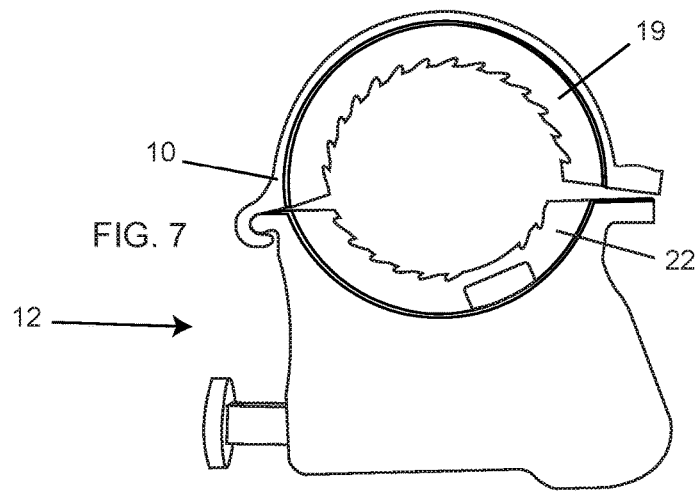
FIG. 7 is a side perspective view of the cruise control which shows the side of the invention that faces away from the throttle housing and towards the rubber/plastic grip. It shows how the single body piece and the pivotable clamp arm can fit between a very narrow gap between the throttle housing and the rubber/plastic grip.

This invention 12, illustrated in the accompanying drawings, is meant to be used as a cruise control 12 for a vehicle which is steered by handlebars 1 and accelerates, maintains and decelerates its speed with a mounted rotatable accelerator sleeve unit 9, similar to a motorcycle. An example of this type of mounted rotatable accelerator sleeve unit 9 is shown in FIGS. 1-3 and 12-13. In FIG. 1 the rubber/plastic grip 4 is fixed to the accelerator sleeve 5 which is mounted to the throttle housing 2. The throttle housing 2 is mounted to the handlebars 1, and has, in this example, two throttle cables 3 protruding out of the throttle housing 2.

FIG. 2 shows the exposed segment of the accelerator sleeve 5 between the throttle housing 2 and the rubber/plastic grip 4, which is where the invention 12 will be mounted. In FIG. 3, the cruise control 12 is attached to the mounted rotatable accelerator sleeve unit 9, and when combined 20, shows where the invention 12 attaches to the accelerator sleeve 5. FIG. 4 shows the pivotable clamping arm 10, its outer hinge 14 and the sidewall of the bolt hole 15. FIG. 4 shows the invention 12 in a position where the nut and bolt 16 have only been cinched down slightly, allowing the invention 12 to be mounted to accelerator sleeve 5 with a large diameter. FIG. 4 is a perspective view, viewing the side of the invention 12 that faces the throttle housing 2. In this view, you can see how the stopper 18 is positioned in relation to the pivotable clamp arm 10 and the single button 8. FIG. 5 shows the invention 12 with the nut and bolt 16 cinched tight to fit on an accelerator sleeve 5 with a narrow diameter. FIG. 6 shows the pivotable clamp 10 fully detached from the single body piece 11 and easily displays the inner part of the hinge 13 and the outer part of the hinge 14.

Figure 10:
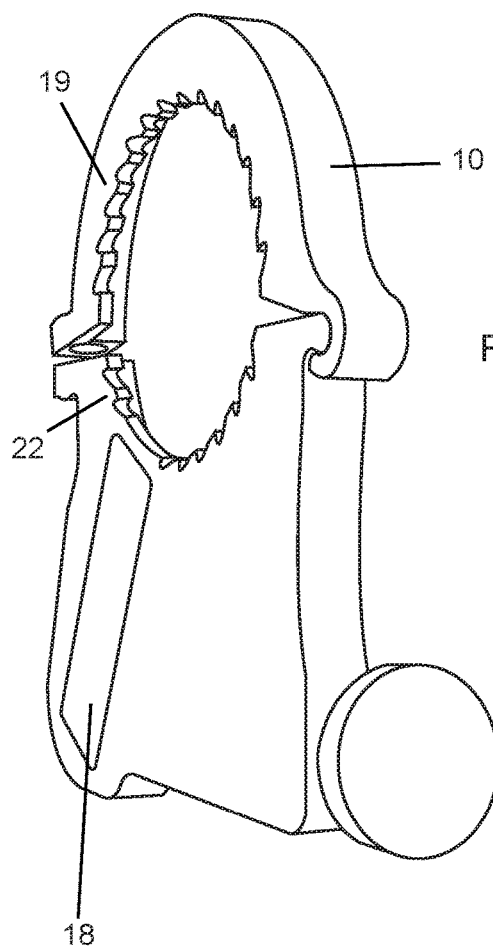
FIG. 10 is a perspective view, very similar to FIG. 3 but viewing the side of the invention which faces the throttle housing, showing the stopper fully disengaged and recessed into the single body piece and showing the bolt holes in the clamp arm. This perspective shows the thin vertical serrated walls on both the pivotable clamp arm and the body piece.

FIG. 7 is a perspective view looking at the invention's 12 side which faces away from the throttle housing 2. FIGS. 7 and 10 shows the pivotable clamp arm's 10 thinner vertical serrated wall 19 and the body piece's 11 vertical serrated wall 22. The vertical serrated walls 19 and 22 are thinner than the overall width of the pivotable clamp arm 10 and the body piece 11, allowing the clamp 10 and body piece 11 to mount in a very small segment of the accelerator sleeve 5 between the throttle housing 2 and the grip 4.

Figure 8:
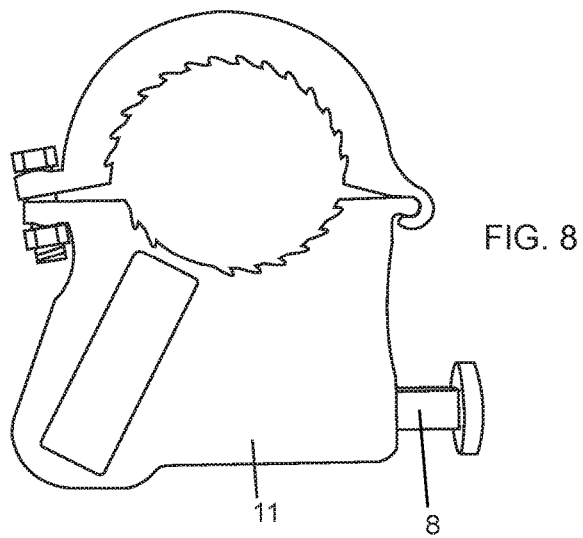
FIG. 8 is a side perspective view, similar to FIG. 5, showing the control button in its properly extended resting position.
Figure 9:
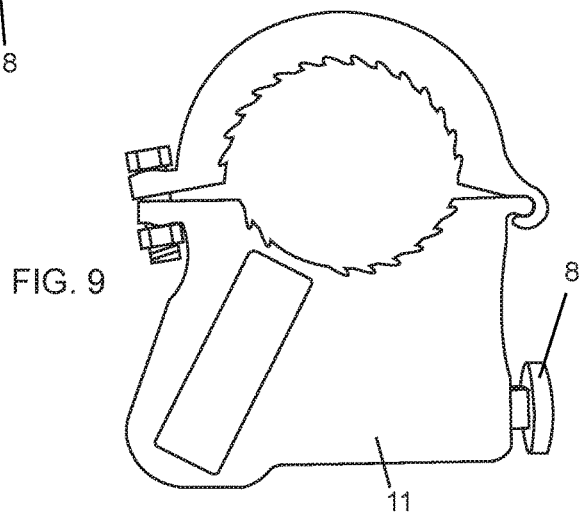
FIG. 9 is a side perspective view, similar to FIG. 5, but showing the control button in its fully compressed position which will either engage the stopper mechanism or disengage the stopper mechanism, compressing the control button will perform the opposite response of the stopper in its current position.

FIG. 8 shows the single button 8 in its properly extended resting position. When this button 8 is pressed in by the operator's thumb, like in FIG. 9, it will be forced back out by a spring-like mechanism housed within the single body piece 11.

Figure 11:
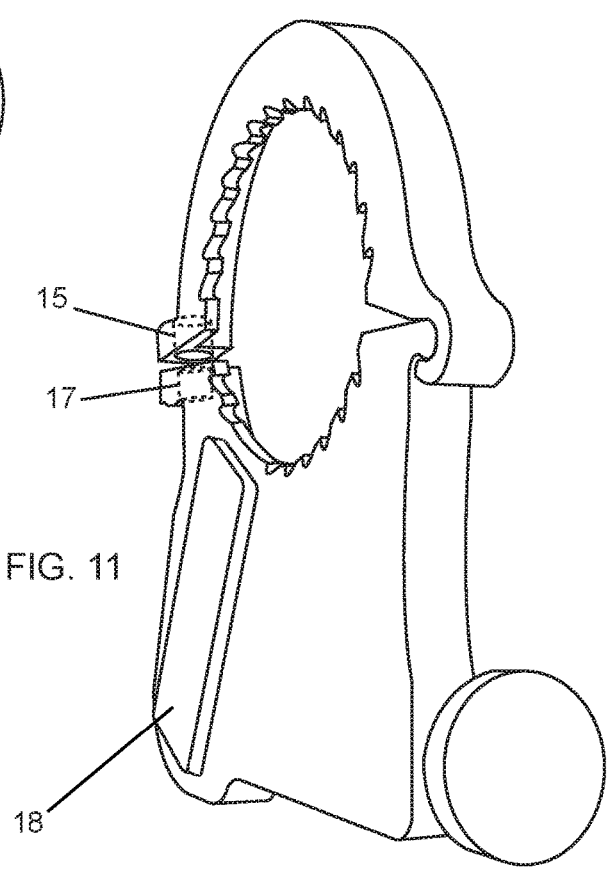
FIG. 11 is a perspective view, similar to FIG. 10, but showing the stopper fully engaged and protruding out of the single body piece.

FIG. 10-11 show exactly how the stopper 18 protrudes and retracts from the single body piece 11. FIG. 10 shows the stopper 18 completely recessed in the single body piece 11, this is how the stopper 18 rests when the invention 12 is fully disengaged. FIG. 11 shows the stopper 18 protruding from the single body piece 11, this is how the stopper 18 rests when the invention 12 is fully engaged.

FIG. 12 shows the combination 20 of the invention 12 attached to the mounted rotatable accelerator sleeve unit 9, similar to FIG. 3. The marker 21 at the end of the grip is showing the accelerator sleeve 5 in its rested state in FIG. 12. FIG. 13 shows the invention 12 and the mounted rotatable accelerator sleeve unit 9 fully combined 20 but unlike in FIG. 12 where the accelerator sleeve 5 is at rest, FIG. 13 shows the accelerator sleeve 5 rotated back to give the operator a comfortable cruising speed, and the invention 12 is holding the mounted rotatable accelerator sleeve unit 9 in place. The marker 21 in FIG. 13 denotes the rotation of the mounted rotatable accelerator sleeve unit 9 and the cruise control 12 combined 20.

This invention has many advantages over other types of motorcycle cruise controls and throttle locks due to its unique design and function. Some devices require the owner of the vehicle to drill into the throttle housing to mount the device, which may void the vehicle's warranty. Other devices require the owner of the vehicle to mount the device to the handlebar itself, taking up precious space on the handlebar, restricting the use of other safety gear such as hand guards and could block the operator's usage and view of the vehicle controls and dash display. Still, other devices require the owner of the vehicle to mount the device to the bar end of the handlebar, these types of throttle locks activate when the operator grips the device and rotates it as they rotate the throttle to accelerate. This is very dangerous and cumbersome for the rider, especially if they are wearing thick gloves and grab the device unintentionally, thus activating the device inadvertently. None of these previously mentioned devices, nor any others not mentioned here, function by rotating with the operator's hand and throttle as the operator accelerates the vehicle. All of the devices mentioned are mounted in place to either the handlebar, the throttle housing or some other non-rotating part, in order to hold the device as an anchor point. This causes a problem since the operator's hand doesn't remain in the same place while they rotate the throttle. Once they rotate the throttle, their hand will rotate away or towards the fixed controls of the cruise controls. The operator has to adjust their hand according to where the cruise control is located. Every time they change speeds, the controls for the cruise control will be in a different location.

My invention 12 is different. It rotates naturally with the operator's hand and the throttle 5. With my invention 12, the controls 8 of my cruise control 12 will move in unison with relation to the operator's hand as they rotate the throttle 5 between various speeds. This invention's 12 controls 8 will always be perfectly located in relation to wherever the operator places their hand and the throttle 5. This is a great advantage for the operator since they will no longer need to slide their hand around the throttle 5 in order to manipulate the controls 8 of the cruise control 12. My invention 12 does not have an anchor point attached to the handlebars 1. My invention 12 doesn't need the owner to mount it to the throttle housing 2, they simply tighten the clamp 10 and the body piece 11 to the rotatable accelerator sleeve 5. My invention 12 does not cover any portion of the rubber/plastic grip 4, it gives the operator full use of the grip 4, as the manufacture intended.

All visible parts of this invention 12, seen in all FIGS. can be fashioned out of any hard metal or plastic or the like by a CNC process, injection molding, die cast molding or any other parts building machine. The parts within the single body piece 11, which are not visible in the FIGS., can be fashioned from similar materials by the same manufacturing processes common to machine shops and the like.

For proper use of this invention 12 on a vehicle, the operator must first detach the nut and bolt 16 and disjoint the outer hinge 14 from the inner hinge 13, which will completely remove the clamp 10 from the single body piece 11. The body piece 11 will then need to be positioned under the accelerator sleeve 5 between the throttle housing 2 and the grip 4, as in FIG. 3. Now, join the inner hinge 13 and the outer hinge 14 to connect the pivotable clamp arm 10 to the body piece 11, then place the bolt 16 through the clamp's 10 bolt hole 15 and through the body piece's 11 bolt hole 17, then cinch the clamp arm 10 down by tightening the nut and bolt 16 until sufficient pressure is made around the accelerator sleeve 5 between the clamp's 10 vertical serrated wall 19 and the body piece's 11 vertical serrated wall 22. The cruise control 12 is now securely attached to the accelerator sleeve 5 and will not slide side to side or rotate around the accelerator sleeve 5, but will move in conjunction with the accelerator sleeve 5.

To operate the mounted rotatable accelerator sleeve unit 9 to accelerate the vehicle, the operator will need to rotate the accelerator sleeve 5 which in turn accelerates the speed of the engine and the vehicle, as well as turns the invention 12 in perfect rotational unity with the accelerator sleeve 5, since the two parts are now attached to each other. Once the operator has reached the desired speed, they can simply use their thumb to press the button 8 in fully, which engages the invention 12 and forces the stopper 18 to protrude from the body piece 11. Once the operator has fully pressed the button 8 in, the stopper 18 will be held in place by the mechanism inside the body piece 11 and the button 8 will automatically extend out of the body piece 11 back to its proper resting position. Now the cruise control 12 is fully engaged and holding the accelerator sleeve 5 in place by using the friction caused from the stopper 18 pressing against the throttle housing 2. This friction is strong enough to resist the biased spring tension on the throttle cables 3 which is constantly trying to rotate the accelerator sleeve 5 back to its resting position, however, it is not strong enough to resist pressure the operator places on the accelerator sleeve 5 if they choose to override the cruise control 12 and accelerate or decelerate the vehicle with the cruise control 12 fully engaged.

When the operator chooses to disengage the cruise control 12, they need to press the button 8 fully in to allow the mechanism inside of the body piece 11 to retract the stopper 18 into its recessed hole within the body piece 11. Once the button 8 is fully pressed in and the stopper 18 has fully retracted, the button 8 will automatically extend out of the body piece 11 back to its resting position, ready to start the entire cycle over again.

The invention claimed is:

1. A cruise control device for a handlebar steered vehicle having a throttle housing which is mounted to said handlebar with a rotatable accelerator sleeve mounted to the throttle housing which controls the movement of a throttle body by means of one or more cables and/or electronic means wherein the cruise control device rotates in unison with the rotatable accelerator sleeve, the cruise control device comprising:
    a single body piece with a semicircle opening, with serrated teeth along an inner edge of the semicircle opening of the single body piece for gripping the rotatable accelerator sleeve with a hinged point on one end of the semicircle opening that joins to a pivotable clamping arm, the pivotable clamping arm a semicircle opening, with serrated teeth along an inner edge of the semicircle opening of the pivotable clamping arm for gripping the rotatable accelerator sleeve with a hinged point on one end that joins to the single body piece's hinge point, and a first bolt hole on the single body piece and a second bolt hole on the pivotable clamping arm which allows bolt to connect the single body piece and the pivotable clamping arm and can be cinched-over the rotatable accelerator sleeve by screwing the bolt into a nut.

2. The cruise control device in claim 1, wherein the single body piece is attached to the rotatable accelerator between the throttle housing and a rubber and/or plastic grip's inner end.

3. The cruise control device in claim 1, wherein the single body piece uses a retractable stopper which when engaged, protrudes perpendicular from a surface of the single body piece, directly against a surface of the throttle housing, restricting the rotatable accelerator sleeve from rotatably moving by friction, but the friction can be overridden by the operator of the vehicle, and once the cruise control device is disengaged by the operator, the retractable stopper will retract into the single body piece, as the retractable stopper was before engagement by the operator.

4. The cruise control device, as defined in claim 3, wherein the cruise control device will be actuated by pressing a button which will slide into the single body piece, causing the retractable stopper to either engage or disengage, the button will automatically extend out of the single body piece back to a resting position, ready to be pressed again to either engage or disengage the cruise control device, performing the opposite engagement of a current state.

5. An apparatus for controlling the speed of a handlebar steered vehicle, the apparatus comprising a throttle housing, a rotatable accelerator sleeve, and a cruise control device, the throttle housing mounted to said handlebar with the rotatable accelerator sleeve mounted to the throttle housing which controls the speed of the handlebar steered vehicle, the rotatable accelerator sleeve controlling the speed of the handlebar steered vehicle by one or more cables and/or electronic means, wherein when the rotatable accelerator sleeve rotates the cruise control device rotates in conjunction with the rotatable accelerator sleeve, comprising:
    a retractable stopper, wherein when disengaged, the retractable stopper is in an initial position while when engaged, the retractable stopper protrudes from the cruise control device, directly against a non-rotatable fixture of the handlebar steered vehicle, creating a frictional force so that the rotating accelerator sleeve is prevented from rotating.

6. The apparatus for controlling the speed of a handlebar steered vehicle of claim 5, wherein the cruise control device is positioned on the rotatable accelerator sleeve between the throttle housing and an inner end of a grip fixed to the rotatable accelerator sleeve.

7. The apparatus for controlling the speed of a handlebar steered vehicle of claim 5, wherein the retractable stopper is engaged or disengaged by an actuable member on the cruise control device.

8. The apparatus for controlling the speed of a handlebar steered vehicle of claim 7, wherein the actuable member is a button.

9. The apparatus for controlling the speed of a handlebar steered vehicle of claim 5, wherein the speed of the handlebar steered vehicle is adjustable when a rotational force overcoming the frictional force is applied to the rotating accelerator sleeve.

10. The apparatus for controlling the speed of a handlebar steered vehicle of claim 5, wherein, when the retractable stopper is in the initial position, the retractable stopper is completely recessed within the cruise control device.

* * * * *